United States Patent [19]

Collette

[11] Patent Number: 5,329,383
[45] Date of Patent: Jul. 12, 1994

[54] METHOD AND APPARATUS FOR PRODUCING COLOR INTERNEGATIVES WITH A DIGITAL PRINTER

[75] Inventor: Robert P. Collette, Pavilion, N.Y.

[73] Assignee: Eastman Kodak Company, Rochester, N.Y.

[21] Appl. No.: 43,232

[22] Filed: Apr. 6, 1993

[51] Int. Cl.$^5$ .......................... H04N 1/46; G03F 3/10
[52] U.S. Cl. ................................... 358/500; 358/506; 358/509; 358/527
[58] Field of Search ............... 358/512, 509, 500, 506, 358/517, 515, 518, 527, 531, 530

[56]  References Cited

U.S. PATENT DOCUMENTS

| | | | |
|---|---|---|---|
| 4,335,399 | 6/1982 | Matsumoto | 358/80 |
| 4,448,521 | 5/1984 | Shiota | 355/77 |
| 4,734,763 | 3/1988 | Urabe et al. | 358/80 |
| 4,833,532 | 5/1989 | Abe | 358/80 |
| 4,841,362 | 6/1989 | Urabe et al. | 358/80 |
| 4,977,448 | 12/1990 | Murata et al. | 358/75 |
| 4,979,032 | 12/1990 | Alessi et al. | 358/76 |
| 5,132,786 | 7/1992 | Ishiwata | 358/500 |
| 5,132,788 | 7/1992 | Hirota | 358/75 |

Primary Examiner—Edward L. Coles, Sr.
Assistant Examiner—Jerome Grant, II
Attorney, Agent, or Firm—Francis H. Boos, Jr.

[57] ABSTRACT

An improved method of producing positive photographic prints in hybrid photofinishing system employing a digital image printer to produce an intermediate negative image on a non-photographic medium wherein digital data used to print the negative includes code values simulating an orange mask effect in the negative. The improvement in the method involves a reduction in the orange mask values in the digital data so as to reduce the D-max values required for digitally printing the intermediate negative thereby reducing print cost and throughput time in the process. In a further improvement, the printer code values for pixels corresponding to full white in the final image are forced to values that print as black in the negative thereby eliminating the orange mask effect for these pixels and rendering improved rendition of full white areas in the final image print.

9 Claims, 4 Drawing Sheets

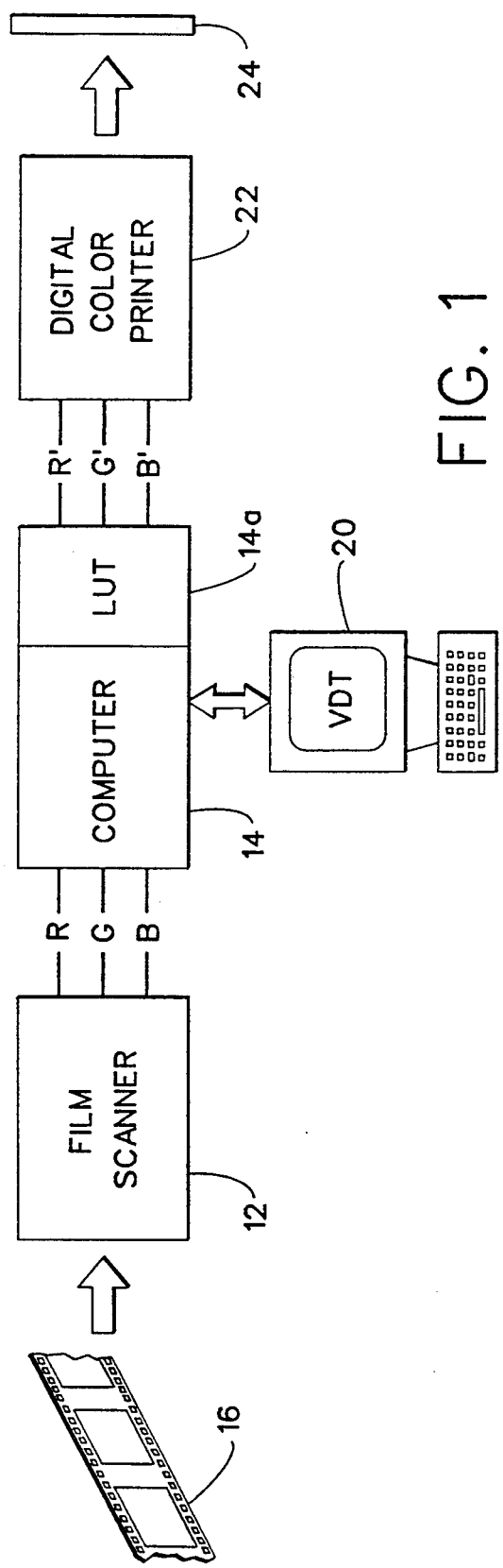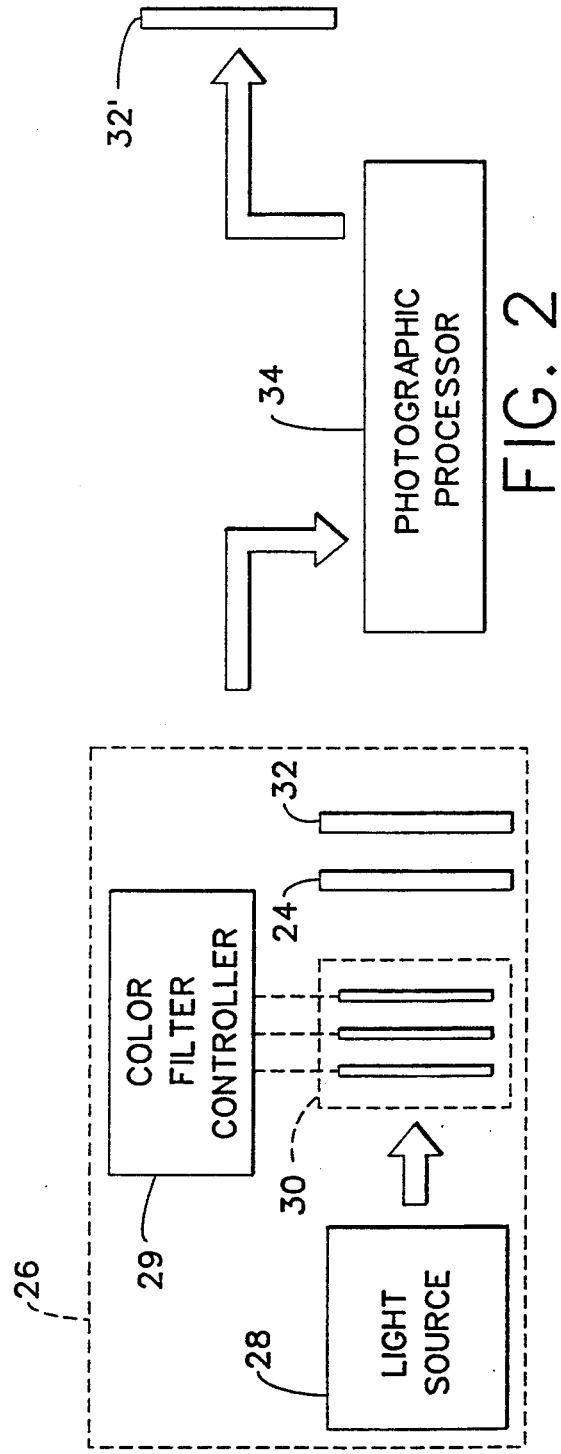
FIG. 1
FIG. 2

METHOD AND APPARATUS FOR PRODUCING COLOR INTERNEGATIVES WITH A DIGITAL PRINTER

FIELD OF INVENTION

This invention relates in general to the field of photo-reproduction systems and more specifically to method and apparatus for producing color internegatives for digitally stored images' data bases.

BACKGROUND

1. Prior Art

Recent improvements in the spatial and data resolution capabilities of digital color image processing systems have made such systems particularly attractive for a variety of photo-processing (e.g. photo-finishing) applications. In still color image photography, for example, once an image (such as that captured on color photographic film or a high resolution color digital camera) has been digitized and stored in an attendant data base, it is readily optimized for reproduction by means of photofinishing image processing software. One example of a color photo-finishing system that takes advantage of this capability is disclosed in co-pending patent application Ser. No. 582,305, filed Sep. 14, 1990, by S. Kristy entitled "Multiresolution Digital Imagery Photofinishing System," assigned to the assignee of the present application and the disclosure of which is herein incorporated.

As described in that application, conventional photofinishing of consumer-generated still color photographs (e.g. those captured on 35 mm color film) involves the use of an analog electro-optic system and an associated chemical-based print developing unit. In the above-referenced Kristy application, there is described a digital image-based photofinishing apparatus that enables the personal customizing and obtaining of high quality prints of photographic images; it also provides for the storage and retrieval of high resolution digitized color still images for playback to a variety of reproduction devices.

To this end, as diagrammatically illustrated in FIG. 1, the digital-image-based photofinishing apparatus employs a high resolution opto-electronic film scanner 12, the output of which is coupled to a digitized image processing computer 14. Scanner 12 may comprise a commercially available Eikonix Model 1435 high resolution scanner, having a very high resolution sensor pixel array (a 3072×2048 pixel matrix) capable of generating high spatial density-representative output signals which, when converted into digital format, yield 'digitized' photographic image files from which high quality color prints may be obtained. Scanner 12 is arranged to be optically coupled with a photographic recording medium, such as a conventional 35 mm color film strip 16. Film strip 16 typically contains a plurality (e.g. a set of twenty-four or thirty-six) 36 mm × 24 mm color image frames. For each scanned image frame, scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied to computer 14 as digitized image pixel signals R,G,B forming an imaging pixel array-representative bit map, resolved to a prescribed code width (e.g. eight bits per color per pixel). Computer 14 contains an image encoding and storage operator through which each high resolution digitized image file is stored in memory. In one mode of operation pertinent to the present invention, the image digital data is processed in computer 14 by reference to code data stored in a lookup table 14a to derive a second set of digital data R',G',B' which is the complement of the input image data. This complement image is the negative image to be printed by a digital color printer 22 onto a non-photographic recording medium 24 and, ultimately, to be used in producing a final positive print image. Optionally, the digital image data may be exchanged with a separate image processing workstation 20 programmed to allow for interactive operations allowing an operator to modify the image data in any desired manner to achieve a pleasing image in the final print. Although the computer 14 is shown as a unit separate from the workstation 20, the functions of the two may, in fact, be incorporated into a single unit.

A high spatial resolution digital output device, such as a digital thermal color printer, is able to provide a high quality hard copy of a customized image directly from the digital data base; in which case the R',G',B' signals would represent a positive image rather than the compliment or negative of the image. However, printing with a high resolution printer of this type is a relatively slow process. Also, because the output reproduction medium (e.g. thermal color print paper) upon which the image is written, is not inexpensive, the price per print remains substantially high, regardless of the number of copies made.

In a conventional analog optical/chemical photofinishing process, on the other hand, multiple copies of an original image can be made through repeated illumination of a negative onto sheets of relatively inexpensive photo-sensitive color print paper, such as Ektacolor (Trademark Eastman Kodak Co.) color print paper and chemically developing the exposed sheets during a reasonably abbreviated processing sequence. Unfortunately, purely optical/chemical processing systems do not offer the flexibility and processing capability of digital image processing systems.

For many years, negative films have employed colored couplers which give the film an orange appearance, referred to as an "orange mask", particularly in the unexposed exposure areas of the film (corresponding to white or near-white areas in the final print). While it is not absolutely necessary to incorporate the orange mask into a negative to be printed, there is a definite advantage. The orange mask partially compensates for the unwanted spectral absorptions in the three dye layers (cyan, magenta, yellow) of the negative film and in the overlapping spectral sensitivities of the photographic paper and gives a dramatic improvement in the color reproduction of the film/paper system.

There are several ways of printing onto photographic paper if no orange mask is incorporated into the negative. In order to get acceptable color balance in neutral areas of prints when printing a negative that has no orange mask, the filtration of the light source used to expose the negative to the photographic print material must be changed by an amount equivalent to the average density of the orange mask. This can be done in one of several ways. The cyan, magenta, and yellow filters in the optical path of the light source can be adjusted to compensate for the absence of the orange mask. Unfortunately, some printers do not have a sufficiently large adjustment range to accommodate such a change. Alternative approaches are disclosed in commonly assigned U.S. Patent Application Ser. No. 631,708 - Manico et al, filed Dec. 12, 1990. In one such alternative, a sheet of translucent "orange" filter material of the proper density is laid over the negative to form a lamination used to expose the print material. While useful for the purpose, this technique has a disadvantage in that the orange filter must be very uniform and have no "blemishes" since it is in the focal plane of the negative. In another such alternative, which is particularly applicable to a system in which the image has been digitized and stored as a digital data base, the digital image is printed onto an intermediate non-photographic recording material to form the internegative and the orange mask is digitally incorporated into the digital image data. This is done by graphically modeling the masking that exists in conventional negative film and modifying the printer look-up tables used for printing the digital image to incorporate data values that result in emulation of the orange mask. The dyes printed by the thermal printer onto the intermediate material incorporate the adjusted color balance needed to emulate the orange mask and the resulting prints photochemically produced on conventional photographic print materials then have substantially similar color characteristics to those made from conventional negatives.

Problem to be Solved

Although this latter process is considered to be an attractive approach to production of prints from a digital image data base, it has been found that incorporating a digital orange mask on a thermal dye printed intermediate material in this manner requires a higher D-max capability on the part of the thermal printer than would be required if no mask were used. This is because densities for a typical Vericolor III negative, having a built in orange mask, range from approximately 0.4, 0.7, 0.9 (Red, Green, Blue) at D-min to 1.35, 1.90, 2.30 (Red, Grn, Blue) at D-max. In the case of many if not all conventional thermal printers, such as a Model XL 7700 thermal printer (Eastman Kodak Co.), it is not feasible to achieve these D-max densities with a single pass through the printer. Consequently it becomes necessary to print the intermediate "negative" in double-pass mode in order to build up enough dye on the material to meet the D-max requirement that corresponds to the conventional Vericolor III negative material, as an example. This double printing results in increased usage of dye materials, increased cost and decreased throughput rates.

SUMMARY OF THE INVENTION

There is therefore provided in accordance with the invention an improved method of producing an image from first digital image data in a system employing a digital image printer to print a complement of the image onto a non-photographic recording medium for subsequent use in photographically reproducing the image on a photographic print medium. In a first preferred embodiment of the invention, the method comprises the steps of (a) processing the first digital image data to derive second digital data representative of a complement of the image, the second digital data incorporating an orange mask value for reproduction of the image on the photographic medium, the orange mask value being reduced by a predetermined amount from that required for desired reproduction of the image on the photographic print medium, (b) operating the printer in accordance with the second digital data to cause the printer to print the complement image onto the non-photographic medium with an orange mask effect corresponding to the modified orange mask value; and (c) illuminating the photographic print medium with the complement image on the non-photographic medium with illumination compensated to introduce an amount of orange mask effect corresponding to the predetermined amount of the orange mask value absent in the second digital data. Preferably, the predetermined amount of the orange mask value corresponds to the D-min value for each color component R, G, B in the image to be reproduced. In a second preferred embodiment of the invention method, the modified orange mask value in the second digital data is further modified to introduce a maximum density value which eliminates any orange mask value for those image pixels corresponding to full white in the image on the photographic print medium.

Thus, with the present invention, the desired adjustment of relative color density values of the digital pixel image data is incorporated into the digitally printed image on the non-photographic recording medium. However, by reducing these values by a predetermined amount, a thermal printer is able to deposit sufficient dyes in a single pass to assure maintenance of the relative color densities provided by an orange mask without exceeding the capability of the printer. Additionally, since only a portion of the orange mask value is removed from the second digital data, it becomes much more likely that the fractional value of orange mask absent in the negative can be replaced by adjustment of the color filters in the typical range of available printer equipment in photofinishing labs. Also, while the partial orange mask value to be replaced in the printer can be added by a separately inserted filter, the present invention advantageously gives the photofinisher the option of avoiding the need to use a separately inserted filter since appropriate adjustment of the color balance filters existing in most, if not all, commercially available optical printers can achieve the desired result.

BRIEF DESCRIPTION OF THE DRAWINGS

FIGS. 1 and 2 diagrammatically illustrate a hybrid image photo-finishing system in accordance with an embodiment of the present invention;

DETAILED DESCRIPTION

Referring now to FIGS. 1 and 2, a diagrammatic illustration of a hybrid image photo-finishing system useful in the practice of the present invention is shown. As previously described, the illustrated system comprises a film scanner 12 adapted to produce first digital image data R, G, B, from an image on a film strip 16. If the film strip is a negative, the scanner is typically provided with a signal inverting process such that signals R, G, B correspond to the positive image ultimately to be produced. These digital image data signals are provided to digital image-processing computer 14, which may typically include image processing via suitable colorimetric transform matrices and look-up tables to provide gamma correction and color balance adjustment to compensate for spectral characteristics of the thermal negative as printed on paper thereby adjusting for color saturation and hue accuracy. Additional adjustments may be achieved by the operator by interaction through workstation 20. The details of gamma correction and color compensation are well known and further detailed discussion is not required since these aspects are outside the scope of the present invention.

These gamma corrected and color adjusted data signals are then processed within computer 14 by means of a lookup table 14a to derive second digital data representative of a complement of the image and to incorporate in the second digital data an orange mask value for reproduction of the image on a photographic medium. In the aforementioned Manico et al application Ser. No. 631,708, second digital data is generated which incorporates a full orange mask value in the data. In accordance with a feature of this invention, however, the second digital data orange mask value incorporated in the second digital data is reduced by a predetermined amount from the full orange mask required for desired reproduction of the image on the intended photographic print medium.

Figure 3:
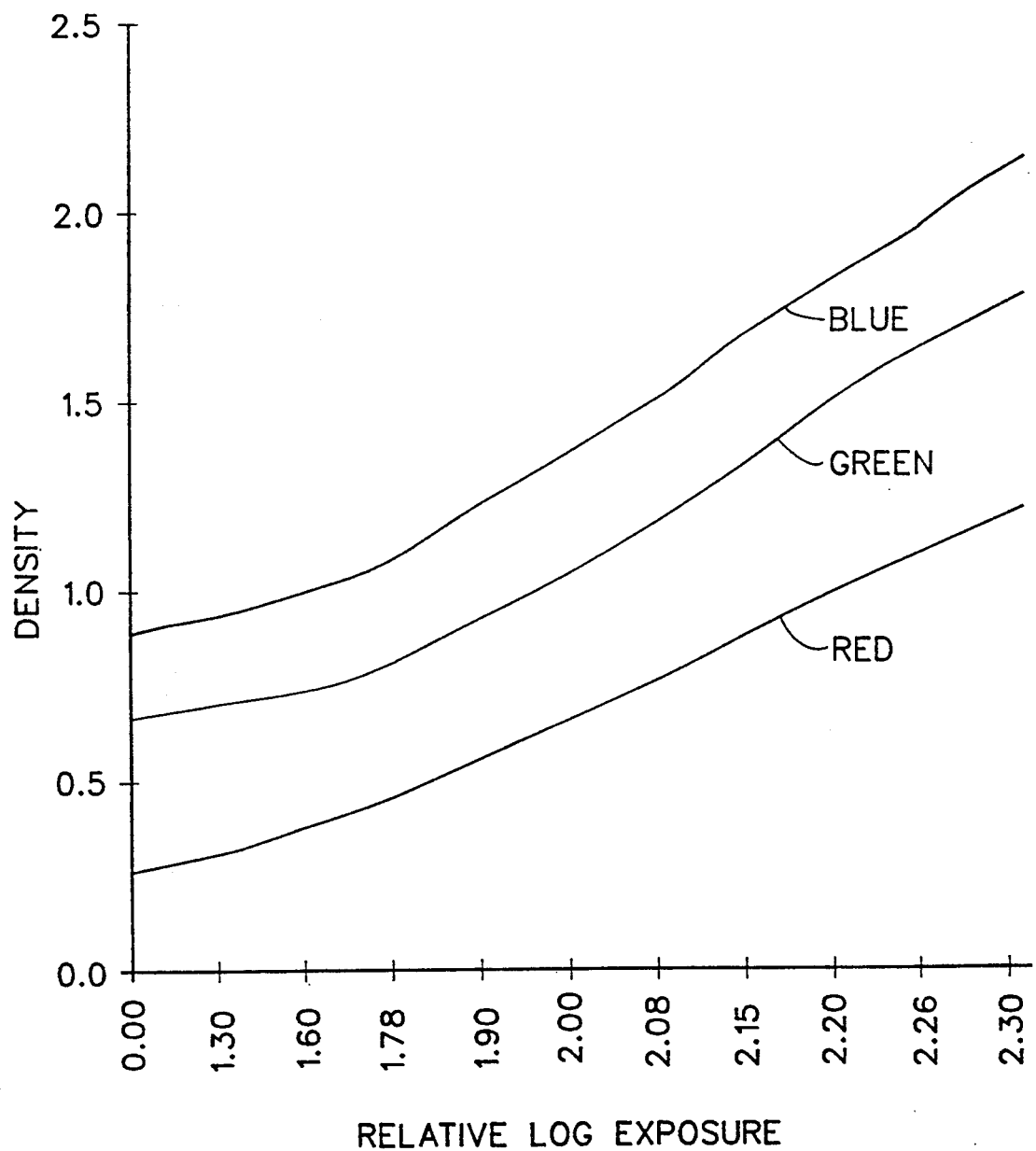
FIGS. 3 and 4 are Density vs Log Exposure graphs used in explaining aspects of the present invention.
Figure 4:
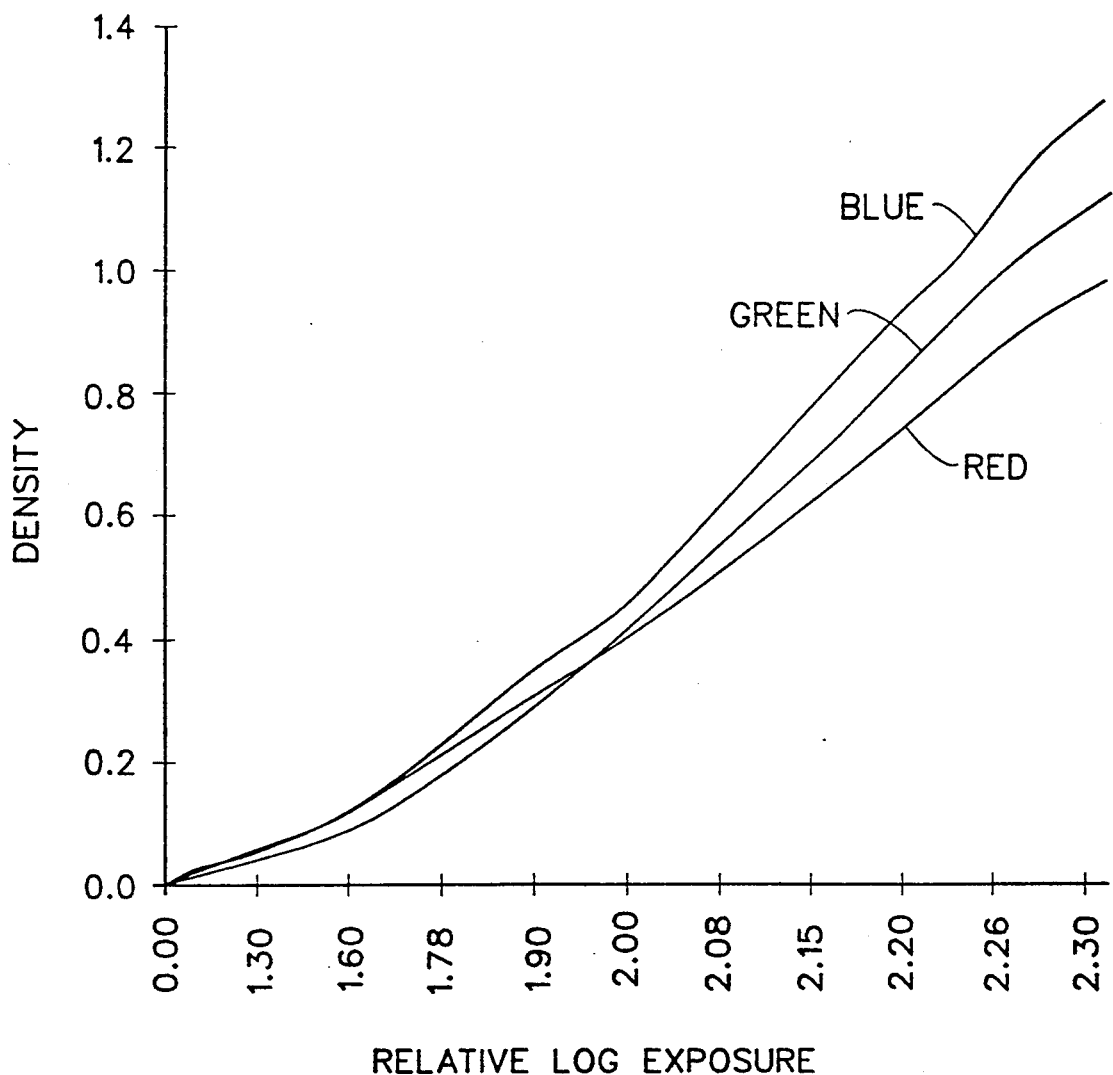
Figure 5:
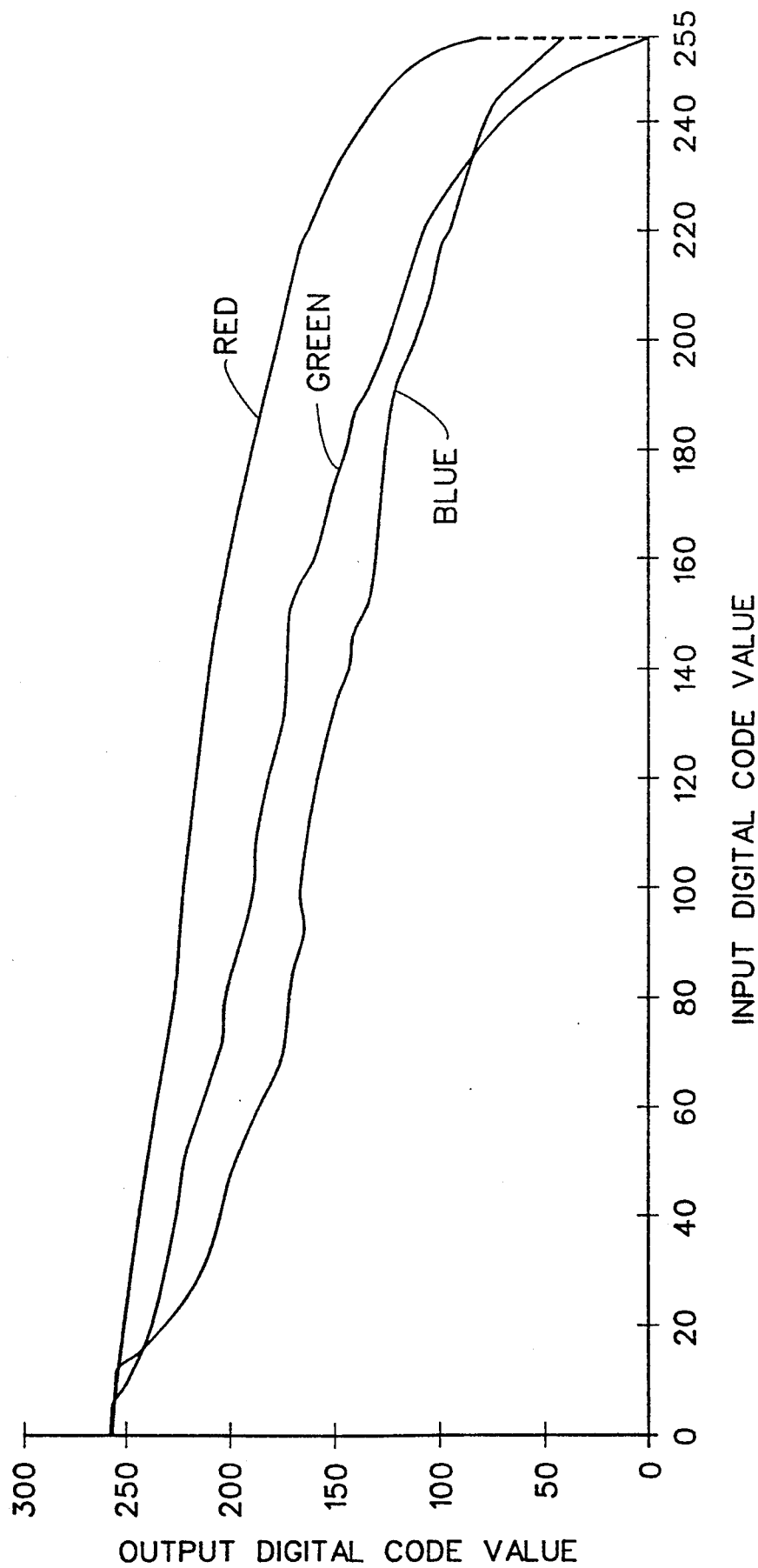
FIG. 5 is a graphical illustration of input/output lookup table code values used in converting image digital data into complement image digital data in a manner embodying the invention.

Referring to FIG. 3, there is illustrated a D-logE graph showing red, green and glue density representative curves for a film image in which full orange mask is present. This would correspond to a conventional Vericolor III (trademark of Eastman Kodak Co.) negative film. It can be seen from these curves that each curve value includes a D-min representative parameter which is, in part, a function of the individual density values resulting from the full orange mask effect built into the Vericolor film. Referring to FIG. 4, these same curves are shown with the D-min representative parameter value removed in accordance with the invention for each color density curve. The result is that each curve retains its relative colorimetric density value resulting from the desired orange mask effect, however the D-max values for each curve are reduced by the eliminated amount corresponding to the D-min value for each respective curve. These various curve values, transposed into digital code vlaues, are stored in lookup table 14a and used to generate the second digital data for signals R',G', B'. FIG. 5 shows a set of curves graphically illustrating digital code values corresponding to the density curves of FIG. 4, the following TABLE I numerically listing the corresponding output code values R', G', B' for every twentieth input code value R,G,B of FIG. 5.

TABLE I

| Input Code Value R,G,B | Output Code Value R' | Output Code Value G' | Output Code Value B' |
| --- | --- | --- | --- |
| 0 | 255 | 255 | 255 |
| 20 | 250 | 239 | 236 |
| 40 | 244 | 227 | 206 |
| 60 | 235 | 213 | 187 |
| 80 | 228 | 201 | 174 |
| 100 | 222 | 191 | 165 |
| 120 | 215 | 183 | 157 |
| 140 | 208 | 171 | 145 |
| 160 | 199 | 159 | 135 |
| 180 | 190 | 147 | 128 |
| 200 | 178 | 129 | 114 |
| 220 | 164 | 108 | 98 |
| 240 | 139 | 72 | 77 |
| 255 | 81 | 0 | 45 |

These lookup table valuews take into account the digital printer and photographic paper characteristics using linear density versus code value aims. They are empirically derived in an iterative process with test prints using linear regression techniques to match the actual printer density values with aim density values in the final print. The foregoing values were derived on the basis of simulating a Vericolor III negative printed onto commercially available "Portra" (trademark Eastman Kodak Co.) photographic print paper. It will be appreciated that other lookup code values can be generated using such a technique for other digital printer and photographic paper combinations.

Referring again to FIG. 1, these partial orange mask adjusted signals R', G' B' are then applied to a digital color printer 22 to cause the printer to print the complement image represented by the signals onto a nonphotographic medium 24 with the modified orange mask incorporated in the printed film image. Medium 24 may, for example, be an XL transparency medium of the type well known for use in producing transparencies for overhead projection. The resultant thermally printed negative is clear in the D-min areas while the D-max areas of the negative have a light orange rather than opaque appearance. With this technique, the printer D-max requirement is reduced by the factor $2.30-0.90=1.40$ D. This is within the capabilities of the XL7700 and other similar thermal printers to accomplish in single-pass mode. With the complement image captured on transparency medium 24, the photofinisher possesses an 'internegative' that can be used to expeditiously replicate relatively low cost copies of the original image by means of an opto/chemical output print process.

The output print process is diagrammatically illustrated in FIG. 2, which shows the aforementioned internegative transparency 24 and a sheet of positive print paper 32, such as Ektacolor (trademark Eastman Kodak Co.) print paper, being illuminated in a photographic printer by a light source 28, so as to form the complement of the negative image onto the print paper 32, i.e. a resultant positive image in latent form. The exposed photographic print paper 32 is then chemically developed in a conventional wet development bath of photographic processor 34, to produce a hard copy reproduction 32' of the positive digital color image, originally processed in computer 14. Because the processing in lookup table 14a of computer 14 effectively eliminated from the second digital image data the values of D-min from each of the color components corresponding to red, green and blue in the final image, the color filters controller 29 is operated to adjust the conventionally provided color balance filters 30 in printer 26 to reintroduce the density values corresponding to the D-min values eliminated in the second digital data used to print the thermal negative 24. Since there is already some orange coloration in the negative, the amount of filtration change required is relatively small and within the capability of virtually all printers.

When opto/chemically reproducing prints from the thermally printed negatives, it was found that exposure or "fogging" of the photographic paper has been experienced in white areas of the print such as borders or full white elements in the image. In these areas, the density of the exposed and processed paper would be the base density of the photographic print paper (typically about 0.10 D). When an exposure time was used in the print process that was sufficient to produce an aim value of 2.0 D for D-max, it was found that full white areas in the final print would measure approximately 0.11–0.13 D. Although, it would be possible to reduce the exposure time to eliminate this "fogging" effect, the resultant density values of the black areas in the print (D-max) would then be reduced by an unacceptable amount.

In order to resolve this difficulty in accordance with a further feature of the invention, the image processing is further modified in a manner which forces the output digital code values sent to thermal printer 22 to be (0,0,0) when the image pixel digital code values input to lookup table 14a are (255,255,255). In this manner, pixels which are full white in the original image are printed at black on the negative 24. While the relative colorimetric values, and thus the orange mask effect, is totally removed for this unique input digital code value (255,255,255), it does not adversely affect the colorimetry of the final print since no exposure of the paper is what is desired for full white pixels in the print.

An example of this modified code mapping is seen in the graph of FIG. 5 and in the corresponding lookup table values set forth in Table I. Using expected values for the modified orange mask look-up table as described above in connection with the graphs of FIGS. 3–5, an index value of (255,255,255) which corresponds to white in the image, would map out to (81,0,45). This value (81,0,45) gives a dark brown appearance to the negative. The new modified algorithm maps the (255,255,255) index value to (0,0,0) thus producing a dense black which effectively blocks any exposure of the paper giving a very good white. It should be noted that this modification in the output code values does not merely change the look-up table output code corresponding to any one input code value of 255 to be an output code value of "0" since this would result in significant color errors for pixel values that contained one or two (but not three) digital code values of 255. Thus, the modification is applicable only for pixels in which all three input code values are simultaneously at the maximum of (255,255,255). This is illustrated best in the following Table II.

TABLE II

| Image Pixel Input Code Value (R,G,B) | Minimum Orange Mask LUT Output Value (R',G',B') | Full White Adjusted LUT Output Code Value (R',G',B') |
| --- | --- | --- |
| (100,200,255) | (222,129,45) | (222,129,45) |
| (255,100,200) | (81,191,115) | (81,191,115) |
| (200,255,100) | (178,0,165) | (178,0,165) |
| (255,255,255) | (81,0,45) | (0,0,0) |

AS can be seen, the only pixel values that are adjusted are those for which the Red, Green, and Blue pixel input code values are all simultaneously 255. To achieve this result, the control processor in computer 14 is simply programmed to recognize the simultaneous existence of the value of 255 in all three input to bypass the lookup table and forces the output code values to 0 while allowing the remaining pixel values to go through the normal look-up table process.

As will be appreciated from the foregoing description, the present invention provides an improved method of operating a hybrid photofinishing system which integrates the low cost and reduced processing time for multiple copy replication by combining an analog optic/chemical system with the digital enhancement flexibility of a digital image processing system. The improvement reduces the cost and throughput time associated with printing the negative image on an intermediate non-photographic medium. In a further improvement, the resultant positive image is enhanced by ensuring that full white in the image is properly reproduced under normal print exposure conditions and without degradation of color in other pixels in the image.

The invention has been described in detail with particular reference to one or more presently preferred embodiments, but it will be understood that variations and modifications can be effected within the scope of the invention as set forth in the claims appended hereto.

In the accompanying drawings, the following reference numerals are used:

12 film scanner
14 image processor computer
14a lookup table
16 film strip
20 workstation
22 digital color printer
24 non-photographic negative
26 photographic printer
28 light source
29 color filters controller
30 color balance filters
32 photographic print paper
32' processed photographic print paper
34 photographic processor

What is claimed is:

1. A method of producing an image from first digital image data in a system employing a digital image printer to print a complement of the image onto a non-photographic recording medium for subsequent use in photographically reproducing said image on a photographic print medium, the method comprising the steps of:

processing said first digital image data to derive second digital data representative of a complement of said image and incorporating in the second digital data a modified orange mask value for reproduction of said image on the photographic medium, said modified orange mask value being less by a predetermined amount than a full orange mask value required for desired reproduction of the image on the photographic print medium;

operating said printer in accordance with said second digital data to cause said printer to print said complement image onto said non-photographic medium with said modified orange mask value; and illuminating said photographic print medium with the complement image on said non-photographic medium with illumination compensated to introduce an orange mask effect corresponding to said predetermined amount of orange mask value absent in said second digital data.

2. A method according to claim 1 wherein said illumination is applied through color balance filters adjusted to introduce said orange mask effect into the illumination.

3. A method according to claim 1 wherein said illumination is applied through a uniform orange density material having an orange density equivalent to said orange mask effect.

4. A method according to claim 1 wherein said modified orange mask value in the second digital data is further modified to a maximum density value which eliminates any orange mask value for those image pixels corresponding to full white in the image on the photographic print medium.

5. A method according to claim 1 wherein said second digital data is further modified to a value that prints as black in the complement image on the nonphotographic medium for those image pixels corresponding to full white in the image to be reproduced on the photographic print medium.

6. A method of producing a color image from first digital image data in a system employing a digitral image printer to print a complement of the color image onto a non-photograhpic recording medium for subsequent use in photographically reproducing said color image on a photographic print medium, the method comprising the steps of:

processing said first digital image data to derive second digital data representative of a complement of said color image, said second digital data being comprised of a digital code value for each of separate color complements in each pixel of said color image, each code value including an added density value generally corresponding to an orange mask in the complement image, said added density value being less than a full orange mask density value by an amount equivalent to a D-min representative parameter in the complement image;

operating said printer in accordance with said second digital data to cause said printer to print said complement image onto said non-photographic medium with said added density values; and illuminating said photographic print medium with the complement image on said non-photographic medium with illumination compensated to introduce in said illumination an illumination effect corresponding to said D-min representative parameter absent in the color data of said second digital data.

7. A photofinishing system for producing an image from first digital data, the system including (a) data conversion means for processing said first digital data to second digital data representing a complement of said image and incorporating values representative of an orange mask in said complement image and (b) a digital image printer to print said complement image onto a non-photographic recording medium for subsequent use in photographically reproducing said image on a photographic print medium, said system characterized by:

said data conversion means being adapted to incorporate modified orange mask values in said second digital data, said modified orange mask values being less by a predetermined amount than that required for desired reproduction of said image on the photographic medium.

8. The photofinishing system of claim 7 wherein said predetermined amount is equivalent to D-min representative parameters for each of separate color components, on a pixel-by-pixel basis, in the image to be reproduced on the photographic medium.

9. The photofinishing system of claim 7 wherein, for image pixels corresponding to #ull white in the image to be reproduced on the photographic medium, said second digital data incorporates values corresponding to black in the complement image to be printed onto the non-photographic medium without incorporation of any orange mask value therein.

* * * * *

UNITED STATES PATENT AND TRADEMARK OFFICE
CERTIFICATE OF CORRECTION

PATENT NO. : 5,329,383
DATED : July 12, 1994
INVENTOR(S) : Robert P. Collette

It is certified that error appears in the above-indentified patent and that said Letters Patent is hereby corrected as shown below:

Col. 9, line 8       "digitral" should read --digital--

Col. 10, line 15     "yalues" should read --values--

Col. 10, line 25     "#ull" should read --full--

Signed and Sealed this

Eighteenth Day of October, 1994

Attest:

BRUCE LEHMAN

*Attesting Officer*          *Commissioner of Patents and Trademarks*